United States Patent
Schwartz et al.

(10) Patent No.: US 10,717,104 B2
(45) Date of Patent: Jul. 21, 2020

(54) ZINC RICH COATING PROCESS

(71) Applicant: MetoKote Corporation, Lima, OH (US)

(72) Inventors: Brent A. Schwartz, Wapakoneta, OH (US); Danielle N. Meienburg, Malinta, OH (US); Todd A. Hermiller, Columbus Grove, OH (US); David J. McNamara, Lima, OH (US); Dennis J. Siefer, Kalida, OH (US)

(73) Assignee: METOKOTE CORPORATION, Lima, OH (US)

( * ) Notice: Subject to any disclaimer, the term of this patent is extended or adjusted under 35 U.S.C. 154(b) by 0 days.

(21) Appl. No.: 15/935,783

(22) Filed: Mar. 26, 2018

(65) Prior Publication Data

US 2018/0207671 A1    Jul. 26, 2018

Related U.S. Application Data

(62) Division of application No. 14/258,494, filed on Apr. 22, 2014, now Pat. No. 9,956,576.

(51) Int. Cl.
| | |
|---|---|
| *B05C 3/10* | (2006.01) |
| *B05C 3/05* | (2006.01) |
| *B05C 9/10* | (2006.01) |
| *B05C 9/12* | (2006.01) |
| *B05C 13/02* | (2006.01) |
| *B65G 49/02* | (2006.01) |

(52) U.S. Cl.
CPC ............... *B05C 3/10* (2013.01); *B65G 49/02* (2013.01); *B05C 3/05* (2013.01); *B05C 9/10* (2013.01); *B05C 9/12* (2013.01); *B05C 13/02* (2013.01)

(58) Field of Classification Search
CPC .... B05C 3/02; B05C 3/05; B05C 3/10; B05C 9/08; B05C 9/10; B05C 9/12; B05C 9/14; B05C 13/02; C23C 2/26; C23C 2/04; C23C 2/28; B65G 49/02; B05D 1/18; B05D 3/12
USPC .......................... 118/407, 423, 428, 429, 500
See application file for complete search history.

(56) References Cited

U.S. PATENT DOCUMENTS

| | | |
|---|---|---|
| 4,255,467 A | 3/1981 | Bounds |
| 4,310,572 A | 1/1982 | Stavros |
| 4,330,574 A | 5/1982 | Pierson et al. |

(Continued)

FOREIGN PATENT DOCUMENTS

| | | | |
|---|---|---|---|
| WO | WO2009132102 | * | 10/2009 |
| WO | WO2013100518 | * | 7/2013 |

*Primary Examiner* — Laura Edwards
(74) *Attorney, Agent, or Firm* — Christopher I. Meyer; Dinsmore & Shohl LLP

(57) ABSTRACT

A coating system and related method for coating a part. The coating system having a process tank filled with a fluid coating material to a fluid coating level and an inert gas blanket formed above the fluid coating level. The coating system also having a process tank conveyor to support a part to be coated. The process tank conveyor having a submerge section which transfers the part through the inert gas blanket and below the fluid coating level, a coating residence section which maintains the part submerged below the fluid coating level for a coating period, a coating removal section which raises the part above the fluid coating level but below the inert gas blanket level, and an inert gas blanket residence section which maintains the part within the inert gas blanket level but above the fluid coating level for a drying period.

12 Claims, 4 Drawing Sheets

(56) References Cited

U.S. PATENT DOCUMENTS

| | | |
|---|---|---|
| 4,391,080 A * | 7/1983 | Brody .................. B65B 55/025 |
| | | 422/302 |
| 4,557,952 A | 12/1985 | Mitch et al. |
| 5,814,126 A | 9/1998 | Cook |
| 2003/0175547 A1 | 9/2003 | Carey, II et al. |
| 2005/0233088 A1 | 10/2005 | Trakowski et al. |
| 2007/0119715 A1 | 5/2007 | Sacks et al. |
| 2007/0193510 A1 * | 8/2007 | Saijo .................. C23C 18/1619 |
| | | 118/429 |
| 2008/0148670 A1 | 6/2008 | Kretzler et al. |
| 2010/0040783 A9 | 2/2010 | Riemer et al. |
| 2012/0045582 A1 | 2/2012 | Gay et al. |
| 2014/0356548 A1 | 12/2014 | Jang et al. |
| 2015/0239001 A1 * | 8/2015 | Tsai .................. B05C 11/1002 |
| | | 438/57 |

* cited by examiner

ZINC RICH COATING PROCESS

CROSS-REFERENCE TO RELATED APPLICATION

This application is a divisional application of U.S. Pat. No. 9,956,576 issued May 1, 2018, the entire disclosure of which is hereby incorporated herein by reference.

BACKGROUND

The present disclosure relates to systems and methods of coating articles and, more particularly, to schemes for immersion dip coating articles in a process tank containing a zinc rich coating material. Although specific reference is made herein to zinc rich coating material, it is contemplated that the present invention will also have applicability to a variety of coating processes utilizing a variety of coating compositions.

In many applications, corrosion resistance of both ferrous and non-ferrous metals is important. Corrosion can result in weakened structural integrity and/or may be detrimental to the visual appeal of the corroded structure. In many applications, such as automobile manufacturing for example, there is a constant push to reduce the overall weight of the finished product. With automobiles, a reduction in curb weight reduces the amount of raw materials needed for manufacture as well as potentially improves fuel economy. However, optimizing designs to minimize material usage also increases the requirement for corrosion performance to prevent degradation of the substrate due to corrosion.

One technique to increase corrosion performance is the application of a corrosion resistant coating. However, release of volatile organic compounds traditionally limits the ability to use a high VOC coating material. When using a high VOC coating material, the overall capacity of the coating machine has traditionally been limited to minimize total volatile organic compounds, which are released. For increased capacity, other VOC mitigation techniques have been required. One such VOC mitigation technique has been regenerative thermal oxidation processes. However, limiting the capacity of the coating machine or use of methods, such as regenerative thermal oxidation processes, have not been economically sustainable techniques.

BRIEF SUMMARY

According to the present disclosure, an article coating method is provided wherein a process tank conveyor transports articles to be coated through the process tank of the coating system along a defined undulating path.

In accordance with one embodiment, a coating system has a process tank with an inlet and an outlet, a coating material supply, an inert gas supply, and a process tank conveyor. The coating material supply is in fluid communication with the process tank and the coating material supply is configured to deliver fluid coating material to a fluid coating level within the process tank. The inert gas supply is in fluid communication with the process tank and the inert gas supply is configured to deliver inert gas to form an inert gas blanket above the fluid coating level but below the inlet and outlet. The process tank conveyor defines a tank conveyor path extending at least between the inlet and the outlet in the process tank. The process tank conveyor is configured to support a part to be coated and comprises a submerge section, a coating residence section, a coating removal section, and an inert gas blanket residence section. The submerge section is adjacent the inlet and includes a portion of the tank conveyor path configured to transfer the part through and below the inert gas blanket and subsequently below a fluid coating level such that the part is submerged below the fluid coating level during coating. The coating residence section is adjacent and downstream of the submerge section and comprises a portion of the tank conveyor path configured to maintain the part submerged below the fluid coating level for a coating period. The coating removal section is adjacent and downstream of the coating residence section and includes a portion of the tank conveyor path configured to raise the part above the fluid coating level but below the inert gas blanket level. The inert gas blanket residence section is adjacent and downstream of the coating removal section and includes a portion of the tank conveyor path configured to maintain the part within the inert gas blanket level but above the fluid coating level for a drying period.

In accordance with another embodiment, a method for depositing a zinc based coating on a part includes providing a process tank having an inlet and an outlet, a fluid coating material comprising zinc, an inert gas blanket above the fluid coating material but below the inlet and the outlet, and a process tank conveyor defining a tank conveyor path extending at least between the inlet and the outlet in the process tank. The method further includes delivering a part through the inert gas blanket and into the fluid coating material, wherein the inert gas blanket reduces moisture from contacting the part. The method additionally includes coating the part in the fluid coating material by maintaining the part in the process tank for a coating period, removing the coated part from the fluid coating material, and drying the part after removal from the fluid coating material by maintaining the part in the inert gas blanket for a drying period.

Other objects of the present invention will be apparent in light of the description of the invention embodied herein.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The present disclosure relates to systems and methods for coating articles. Although the present disclosure is described with specific reference to immersion dip processes, coating methods contemplated by the present disclosure can comprise numerous methods including, but not limited to, immersion dip, electrocoating, electroplating, spray coating, powder coating, and other suitable coating methods known to one of ordinary skill in the art.

Coating of materials, such as metals, may improve the corrosion resistance of the base material. One such type of coating is a zinc rich coating, which increases corrosion performance and resists degradation of the substrate due to corrosion.

Figure 1:
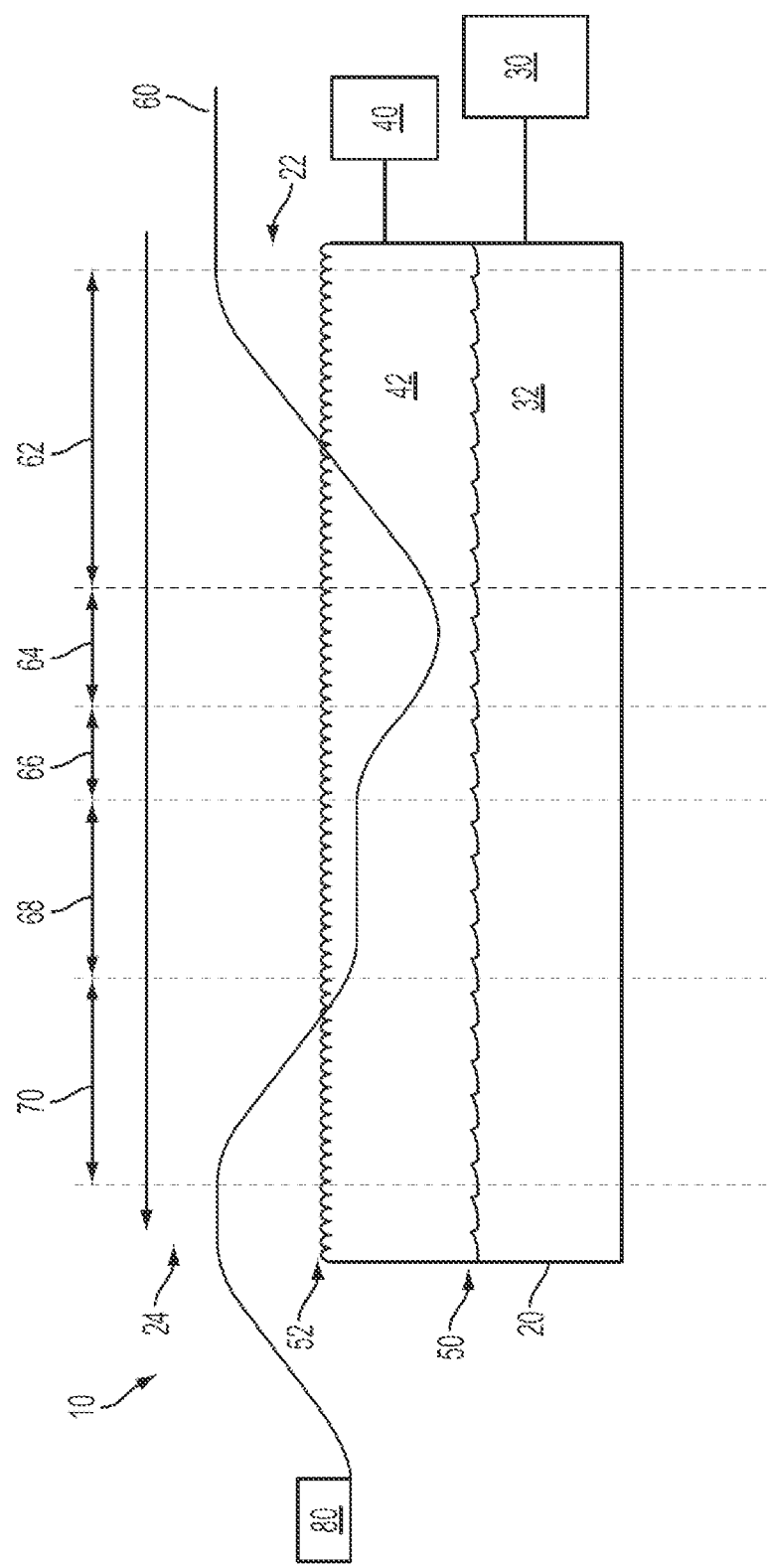
FIG. 1 is a schematic depiction of an embodiment of a coating system.
Figure 2:
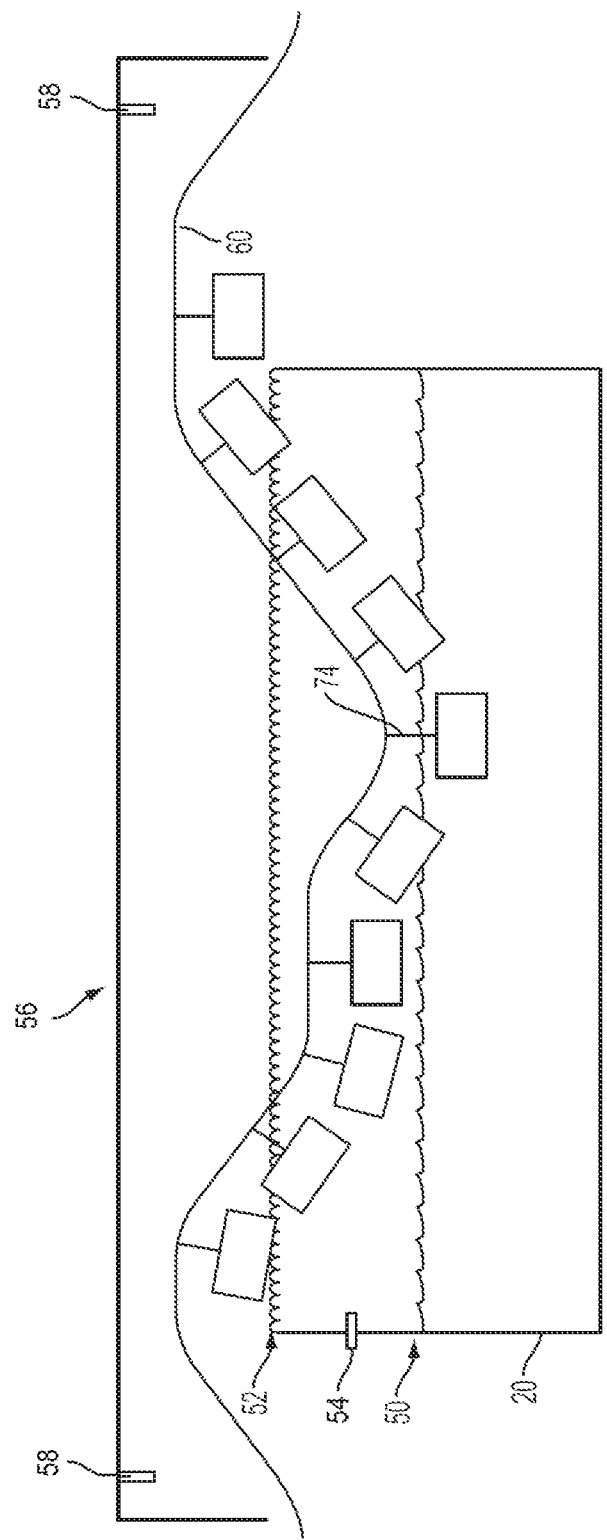
FIG. 2 is a schematic depiction of an embodiment of a coating system.

Referring to FIGS. 1 and 2, the coating system 10 of the present disclosure comprises a process tank 20, which further includes an inlet end 22 and an outlet end 24. Moreover, the coating system 10 comprises a coating material supply 30 configured to provide a fluid coating material 32 (for example, Spectracron SPR67868A Zinc Rich Primer manufactured by PPG Industries, Inc.) to the process tank 20. The coating material supply 30 is in fluid communication with the process tank 20. The coating material supply 30 may be configured to deliver fluid coating material 32 to a fluid coating level 50 within the process tank 20. Additionally, the coating system comprises an inert gas supply 40. The inert gas supply 40 is in fluid communication with the process tank 20. The inert gas supply 40 is configured to deliver inert gas to form an inert gas blanket 42 above the fluid coating level 50 but below an inlet and outlet. The inert gas blanket 42 extends from the fluid coating level 50 to the inert gas blanket level 52. The coating system 10 further comprises a process tank conveyor 60. The inert gas blanket 42 advantageously reduces moisture from contacting the part and the fluid coating material 32. The process tank conveyor 60 is disposed in the process tank 20 between the inlet 22 and the outlet 24 and is configured to support a part to be coated.

The coating material supply 30 is anything suitable to provide a high VOC material to the process tank 20. For example, the coating material supply 30 may be a gravity fed or pump driven reservoir connected to the process tank 20. An additional non-limiting example includes multiple reservoirs containing individual components of a fluid coating material 32 dispatched individually and mixed in the process tank 20.

The inert gas supply 40 is anything suitable to provide an inert gas to the process tank 20. For example, the inert gas supply 40 may be a vessel of compressed inert gas connected to the process tank 20 via a regulator, valves, and piping. An additional non-limiting example includes a chamber in which, upon mixing of defined reactants, a chemical reaction releases an inert gas.

Figure 3:
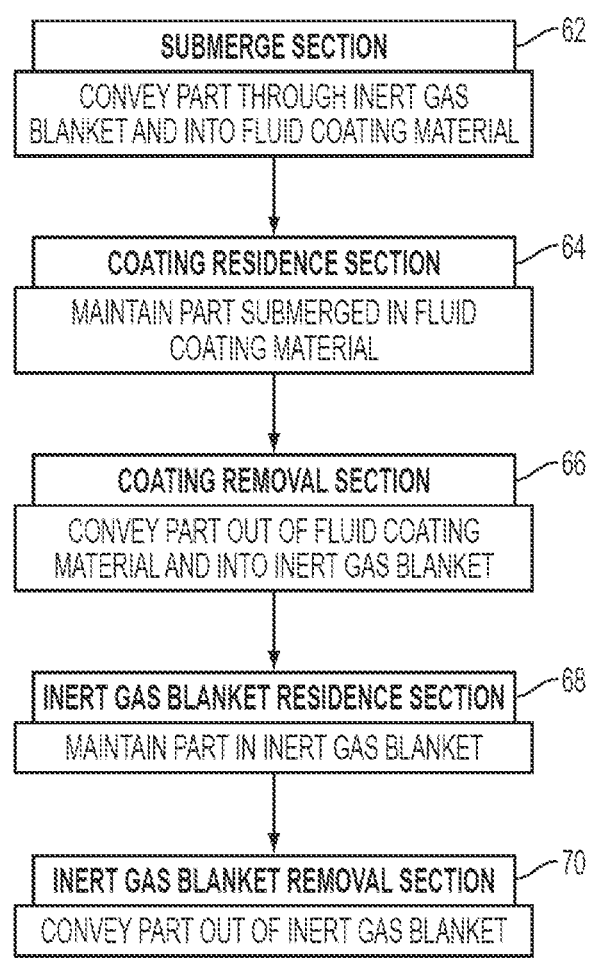
FIG. 3 is a flowchart of an embodiment of a method for depositing a zinc based coating.

Referring to FIGS. 1 and 3, the process tank conveyor 60 forms a defined undulating path. For purposes of this disclosure, an "undulating path" is in accordance with FIGS. 1 and 3 where the process tank conveyor 60 forms a path which has a smooth flowing motion and rounded transitions between sections of the path.

The process tank conveyor 60 comprises a submerge section 62 adjacent the inlet end 22 of the process tank 20. The submerge section 62 is a path extending through and below the inert gas blanket 42 and subsequently extending below the fluid coating level 50. The submerge section 62 is positioned such that the part to be coated is delivered through the inert gas blanket 42 and submerged below the fluid coating level 50 during coating. In an embodiment of the coating system, the submerge section 62 is an angled path relative to horizontal. For purposes of this disclosure, "horizontal" is defined as the plane naturally formed by the surface of the fluid coating material 32 in an undisturbed state along with all parallel planes.

The process tank conveyor 60 comprises a coating residence section 64 adjacent and downstream of the submerge section 62. The coating residence section 64 is a path configured to maintain the part submerged below the fluid coating level 50 for a coating period.

In an embodiment, the coating period is a time sufficient to develop a coating of the fluid coating material 32 on the part. Selected examples include a coating period of approximately 30 seconds, approximately 60 seconds, or approximately 90 seconds. In further embodiments, the coating period may be 1 second or less. In an immersion dip process the fluid coating material 32 must only make contact with the part to be coated and a sustained residence time to develop a coating is unnecessary.

In a further embodiment of a method for depositing a fluid coating material 32 on a part, the process tank conveyor 60 stops for an index hold when the part is fully immersed in the fluid coating material 32 at the coating residence section 64. Further parts are held fully within the inert gas blanket 42 at the inert gas blanket residence section 68. The index hold allows the overall size of the process tank 20 to be reduced as sufficient residence time in the inert gas blanket 42 for excess fluid coating material 32 to drip free of the part is achieved with a reduced overall length of the inert gas blanket residence section 68 by virtue of the termination of forward momentum during the index hold. Additionally, intermittent driving of the process tank conveyor 60 to create the index hold allows an indexing pretreatment system to be utilized.

With an indexing pretreatment system the process tank conveyor 60 ceases forward motion for a period of time with the part fully immersed in the inert gas blanket 42. The period where the process tank conveyor 60 ceases forward motion for a period of time with the part fully immersed in the inert gas blanket 42 is the index hold. In various embodiments, the index hold is approximately 30 seconds, approximately 1 minute, approximately 3 minutes, or approximately 5 minutes. The period of the index hold is determined by the length of time requires for excess fluid coating material 32 to drip from the part and is thus dependent on the viscosity of the fluid coating material 32 as well as the geometry of the part.

The process tank conveyor 60 also comprises a coating removal section 66 adjacent and downstream of the coating residence section 64. The coating removal section 66 is a path configured to raise the part above the fluid coating level 50 but maintain it below the inert gas blanket level 52. In an embodiment of the coating system, the coating removal section 66 is an angled path relative to horizontal.

The process tank conveyor 60 comprises an inert gas blanket residence section 68 adjacent and downstream of the coating removal section 66. The inert gas blanket residence section 68 is a path configured to maintain the part within the inert gas blanket level 52 but above the fluid coating level 50 for a drying period. Holding the part in the process tank 20 and the inert gas blanket 42 for the drying period reduces the emission of volatile organic compounds from the process tank 20. Additionally, the inert gas blanket residence section 68 allows excess fluid coating material 32 to drip from the part and be reintroduced to the bulk fluid coating material 32 in the process tank 20 without exposure to the environment outside the process tank 20.

In embodiments, the drying period is a time sufficient to allow excess fluid coating material 32 on the part to drip away from the part. It is desirable for all excess fluid coating material 32 to be removed from the part prior to removal of the part from the inert gas blanket residence section 68 because as soon as the fluid coating material 32 leaves the process tank 20 it cannot be reintroduced and used on later parts. Exposure of the fluid coating material 32 to humidity outside the process tank 20 changes the properties of the fluid coating material and reintroduction of the fluid coating material to the bulk supply of fluid coating material 32 in the process tank 20 would contaminate the bulk supply of fluid coating material 32. Additionally, in embodiments, the fluid coating material 32 is costly and removal of excess fluid coating material 32 is desirable to avoid excessive coating thickness and unnecessary expense. The drying period necessary for excess fluid coating material 32 to drip from the part varies based on various factors including the viscosity of the fluid coating material 32 and the geometry of the part. For example, it takes longer for excess fluid coating material 32 to drip away from a larger part than a relatively smaller part. Also, it takes longer for excess fluid coating material 32 to drip away when the fluid coating material 32 has a relatively higher viscosity as the flow and drip rate is slowed. Selected examples include a drying period of approximately 30 seconds, approximately 1 minute, approximately 3 minutes, or approximately 5 minutes. In still further embodiments, the part may be reoriented to facilitate drainage and dripping of excess fluid coating material 32. For example, the geometry of a part may form a reservoir of fluid coating material 32 which is able to drain and drip upon rotation of the part along one or more axes.

In further embodiments, the drying period is a time sufficient to allow the coating of the fluid coating material 32 on the part to develop a tack free surface film. Selected examples include a drying period of approximately 1 minute, approximately 3 minutes, approximately 5 minutes, or approximately 10 minutes.

In an embodiment, the fluid coating material 32 is cured at approximately 350° C. to approximately 500° C. Specific, non-limiting examples include curing the fluid coating material 32 at approximately 400° C. or approximately 450° C. The curing period occurs subsequent to removal from the process tank 20 in a drying oven (not shown). In an embodiment, to control the emission rate of volatile organic compounds, air is driven into the drying oven at a selected rate so that the volatile organic compounds will be driven out of the drying oven at a known and acceptable rate.

In an embodiment, the process tank conveyor 60 of the coating system 10 also includes an inert gas blanket removal section 70. The inert gas blanket removal section 70 is downstream of and preferably adjacent the inert gas blanket residence section 68. The inert gas blanket removal section 70 is an angled path configured to raise the part above the inert gas blanket level 52 towards the outlet end 24 of the process tank 20.

In another embodiment, the process tank conveyor 60 forms a defined path with sharp transitions between sections of the path. The transitions between sections of the path, for example between the submerge section 62 and the coating residence section 64, represent an immediate change in path direction to create a series of linked linear path sections. In still a further embodiment, the submerge section 62 and/or the coating removal section 66 is configured to transport the part at approximately 90 degrees from horizontal (vertical) in a stepwise arrangement. For example, the submerge section 62 lowers the part substantially vertically, the coating residence section 64 moves the part substantially horizontally, the coating removal section 66 raises part substantially vertically, and the inert gas blanket residence section 68 moves the part substantially horizontally.

In an embodiment of the coating system 10, the inert gas blanket removal section 70 is angled at approximately 10 degrees to approximately 30 degrees from horizontal. In a further embodiment of the coating system 10, the inert gas blanket removal section 70 is angled at approximately 10 degrees to approximately 45 degrees from horizontal. In still a further embodiment, the inert gas blanket removal section 70 may be angled up to approximately 90 degrees to create a stepwise arrangement.

In an embodiment of the coating system 10, the submerge section 62 is angled at approximately 10 degrees to approximately 30 degrees from horizontal. In a further embodiment of the coating system 10, the submerge section 62 is angled at approximately 10 degrees to approximately 45 degrees from horizontal. In still a further embodiment, the submerge section 62 may be angled up to approximately 90 degrees to create a stepwise arrangement.

In an embodiment of the coating system 10, the coating removal section 66 is angled at approximately 10 degrees to approximately 30 degrees from horizontal. In a further embodiment of the coating system 10, the coating removal section 66 is angled at approximately 10 degrees to approximately 45 degrees from horizontal. In still a further embodiment, the coating removal section 66 may be angled up to approximately 90 degrees to create a stepwise arrangement.

In an embodiment of the coating system 10, the inert gas blanket removal section 70, the submerge section 62, and the coating removal section 66 are individually angled at approximately 10 degrees to approximately 30 degrees from horizontal. Additional envisioned angles of the coating system 10, the inert gas blanket removal section 70, the submerge section 62, and the coating removal section 66 include approximately 10 degrees to approximately 45 degrees from horizontal, approximately 15 degrees to approximately 25 degrees from horizontal, and approximately 15 degrees to approximately 20 degrees from horizontal. The angles of the inert gas blanket removal section 70, the submerge section 62, and the coating removal section 66 may all be substantially similar or may each have disparate values within the disclosed ranges.

The angles of each section of the process tank conveyor 60 affect the rate of submersion or removal of the part from the fluid coating material 32. For example, a steeper angle at the coating removal section 66 results in a relatively faster rate of part removal from the fluid coating material 32 than a shallow angle at a given speed of the process tank conveyor 60. As one factor in the determination of fluid coating material 32 thickness on the finished part is withdrawal rate from the fluid coating material 32, the angle of inclination of each section of the process tank conveyor 60 may affect the finished coating thickness.

In an embodiment of the coating system 10, the angle of at least one of the sections of the process tank conveyor 60 is adjustable. Environmental conditions such as temperature or different fluid coating material 32 compositions may require different withdrawal rates. For example, the viscosity of the fluid coating material 32 may change with varying temperatures or differing compositions, which in turn changes the most desirable withdrawal rate of parts from the fluid coating material 32. Variable angle sections of the process tank conveyor 60 allow a single coating system 10 to adapt to different or changing process conditions.

The viscosity of the fluid coating material 32 also affects the coating thickness on the part in addition to withdrawal rate from the fluid coating material 32. However, the viscosity is maintained within a set operating window and the withdrawal rate being the primary control of coating thickness. In various embodiments, the viscosity of the fluid coating material 32 at application is approximately in the range of 23-30 seconds using a #2 EZ Zahn cup which corresponds to approximately 31 to approximately 56 centistokes.

Coating thickness affects the performance of the coating. Corrosion performance suffers with a coating that is too thin. Conversely, adhesion performance of the coating declines with a coating that is too thick. Additionally, an overly thick coating also has an economic impact in waste of fluid coating material 32 for each incremental thickness beyond the required minimum. In an embodiment, the coating thickness of parts utilizing the coating system 10 is in the range of approximately 0.2 to approximately 0.6 mils. In a further embodiment, the coating thickness of parts utilizing the coating system 10 is in the range of approximately 0.3 to approximately 0.5 mils. However, coating thicknesses outside the exemplary ranges are understood as desirable for some applications, and would be understood by one of ordinary skill in the art as beneficial.

The inert gas blanket 42 provides a barrier between the fluid coating material 32 and the ambient atmosphere. Sequestration of the fluid coating material 32 from moisture is desirable. If moisture contaminates the fluid coating material 32 it results in the fluid coating material 32 increasing in viscosity and gelling. Additionally, the inert gas blanket 42 retains volatile organic compounds and other gases within the process tank 20. In an embodiment, the inert gas blanket 42 is argon. Other non-limiting examples for the inert gas blanket 42 include additional noble gases or nitrogen.

In further embodiments, the process tank 20 has a sensor 54 disposed in the wall of the process tank 20. The sensor 54 is positioned in the wall of the process tank 20 such that the sensor 54 is capable of measuring parameters associated with the inert gas blanket 42. In embodiments, the sensor 54 is configured to measure the level of the inert gas blanket 42 and ensure the inert gas blanket level 52 remains at or above the desired minimum level. For example, the sensor 54 may be an $O_2$ sensor positioned at the minimum desired level of the inert gas blanket level 52 so that if the inert gas blanket level 52 falls below the desired minimum the sensor 54 will detect an increase in $O_2$ readings. The sensor 54 may then issue an alert or automatically issue a command to transfer additional inert gas from the inert gas supply 40 to the process tank 20.

In further embodiments, the sensor 54 is configured to measure for the presence of $H_2O$/humidity. As $H_2O$ is detrimental to the fluid coating material 32, detection of $H_2O$/humidity within the inert gas blanket 42 allows remedial action to be taken to prevent or lessen exposure of the fluid coating material 32 to $H_2O$. For example, upon detection of $H_2O$ by the sensor 54, replacement inert gas may be provided from the inert gas supply 40 to force the humid inert gas away from the process tank 20 or dilute the humid inert gas until acceptable humidity levels are obtained.

In an embodiment, the coating material supply 30 is fluidly connected to the process tank 20. Transfer of the fluid coating material 32 to the process tank to replenish fluid coating material 32 utilized in the operation of the coating system 10 is preferably achieved without exposure of the fluid coating material 32 to the surrounding environment. Non-limiting examples of methods to transfer the fluid coating material 32 from the coating material supply 30 to the process tank 20 include an enclosed pipe which discharges into the process tank 20 below the fluid coating level 50 and/or into the process tank 20 above the fluid coating level 50 but below the inert gas blanket level 52. Avoidance of exposure of the fluid coating material 32 to the surrounding environment alleviates volatile organic compound emissions as well as contamination of the fluid coating material 32 from exposure to water/humidity.

In another embodiment, the inert gas supply 40 is fluidly connected to the process tank 20. Transfer of the inert gas supply 40 to the process tank to replenish inert gas lost from the inert gas blanket 42 during operation of the coating system 10 ensures the inert gas blanket 42 remains intact. Non-limiting examples of methods to transfer the inert gas from the inert gas supply 40 to the process tank 20 include an enclosed pipe which discharges into the process tank 20 below the fluid coating level 50 allowing the inert gas to bubble through the fluid coating material and form the inert gas blanket 42 and/or into the process tank 20 above the fluid coating level 50 but below the inert gas blanket level 52. In yet another embodiment, replenishment of the inert gas blanket 42 is continuous. Excess inert gas from the inert gas blanket 42 may simply flow out of the process tank 20.

A conveyor propulsion source 80 configured to drive the process tank conveyor 60 is further provided in an embodiment of the coating system 10. The conveyor propulsion source 80 drives the process tank conveyor 60 and in turn drives the parts to be coated through the coating system 10. Non-limiting examples of conveyor propulsion sources 80 include a motor in combination with a drive gear, drive belt, or drive chain; or a magnetic drive system.

In an embodiment of the coating system 10, the conveyor propulsion source 80 is further configured to drive the process tank conveyor 60 at a variable speed. A variable speed process tank conveyor 60 allows the withdrawal rate of parts from the fluid coating material 32 to be adjusted. A faster process tank conveyor 60 results in quicker withdrawal from the fluid coating material 32. Conversely, a slower process tank conveyor 60 results in a slower withdrawal from the fluid coating material 32 for a given angle of the coating removal section 66.

Figure 4:
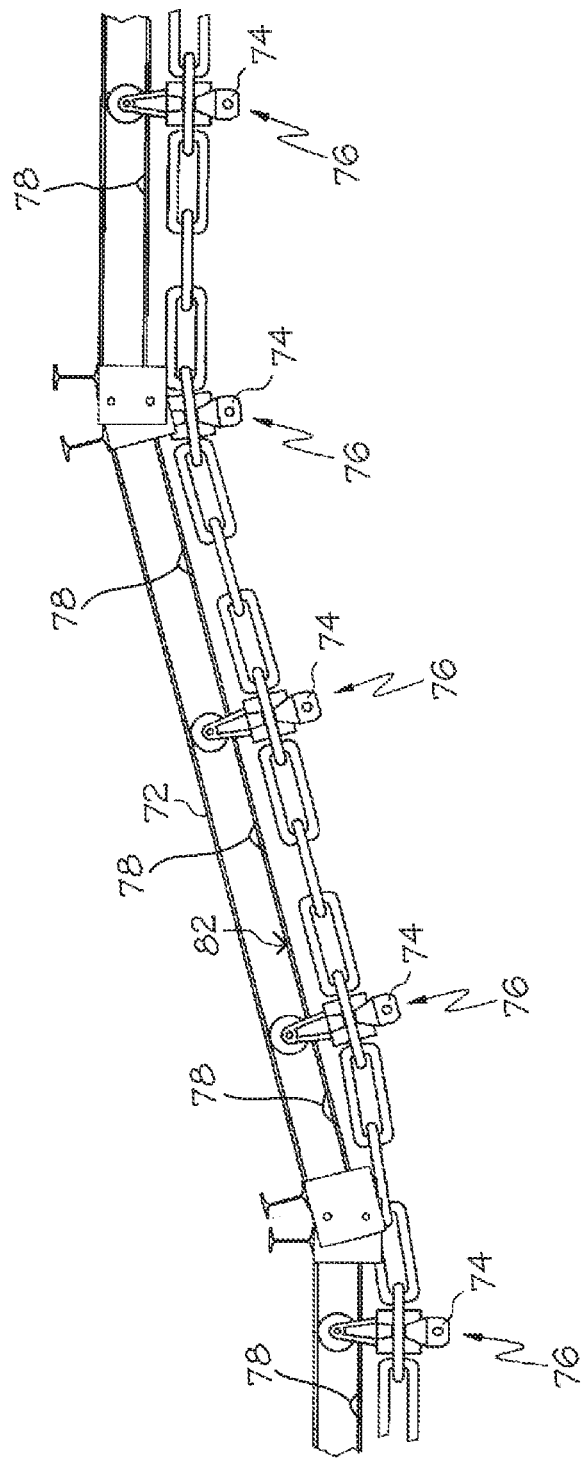
FIG. 4 is a front view of a guide track in accordance with one or more embodiments of the disclosure.

Referring to FIG. 4, in an embodiment, the process tank conveyor 60 comprises a guide track 72. The guide track 72 forms a predetermined pathway through the process tank 20. In an embodiment, the process tank conveyor 60 comprises a plurality of hanger elements 74 and hardware 76 characterized by differential movement, i.e., parts that move relative to one another, in addition to a guide track 72. The hardware 76 connects the hanger elements 74 to the guide track 72. The hanger elements 74 are adapted to receive and support the part while the part is transferred through the process tank 20.

In an embodiment, the guide track 72 further comprises bumps 78. The bumps 78 on the guide track 72 are configured to cause shaking or vibrating of parts progressing through the coating system 10. The hanger elements 74 are coupled to the guide track 72 with the hardware 76 characterized by differential movement, and as the hardware 76 moves along the guide track 72, bumps 78 on the guide track 72 cause movement of the hanger elements 74 in a direction different than the direction of travel. In an embodiment, the bumps 78 are disposed on the bottom wall 82 of the guide track 72. As the hardware 76 and hanger elements 74 move along the guide track 72, the bumps 78 cause sharp motion in a first direction substantially perpendicular to the direction of travel.

In an embodiment, the bumps 78 along the guide track 72 are disposed along the coating removal section 66. As the part exits the fluid coating material 32, the shaking and vibration imparted by the bumps 78 along the guide track 72 accelerate drainage of excess fluid coating material 32.

In an embodiment, the bumps 78 along the guide track 72 are disposed along the inert gas blanket residence section 68. As the part is held in the inert gas blanket 42, the shaking and vibration imparted by the bumps 78 along the guide track 72 accelerate drainage of excess fluid coating material 32.

In an embodiment, excess fluid coating material 32 is recovered as part of the coating system 10. Specifically, as the part traverses the coating removal section 66 and/or the inert gas blanket residence section 68, excess fluid coating material 32 is collected in the process tank 20.

Without wishing to be bound by theory, use of high VOC coating materials have traditionally limited the capacity of coating machines or required economically unsustainable mitigation techniques. The apparatus and method of the present disclosure overcomes this deficiency and allows utilization of high VOC coating materials. The fluid coating material 32 in an embodiment comprises at least 2 pounds per gallon of volatile organic compounds. In another embodiment, the fluid coating material 32 comprises at least 3 pounds per gallon of volatile organic compounds. In a further embodiment, the fluid coating material 32 comprises at least 5 pounds per gallon of volatile organic compounds. Volatile organic compounds are present in a variety of coating materials but, as previously indicated, present handling and usage challenges. Specifically, high volatile organic compound levels necessitate remediation efforts to avoid environmental non-compliance issues. The inert gas blanket 42 provides a barrier layer between the fluid coating material 32 with high volatile organic compound levels and the surrounding environment.

In a further embodiment, the process tank 20 includes a sequestration partition 56. The sequestration partition 56 forms a lid over the process tank to reduce and/or eliminate flow of air across the top of the inert gas blanket 42. Additionally, the sequestration partition 56 protects against solid and/or liquid contaminants and particles from the environment the process tank 20 is placed in from settling in the process tank 20. In a further embodiment, the sequestration partition 56 also includes conditioned gas nozzles 58 configured to form a gas curtain at the inlet end 22 and outlet end 24 of the process tank 20. The conditioned gas nozzles 58 provide a directed flow of gas directed outwardly toward the inlet end 22 and outlet end 24 of the process tank 20 to reduce and/or eliminate air currents from flow under the sequestration partition 56 and over the process tank 20. The gas proved by the conditioned gas nozzles 58 may be, for example, dry conditioned air, an inert gas, or nitrogen.

In an embodiment, the fluid coating material 32 is a zinc rich coating comprising zinc. In various embodiments the fluid coating material 32 comprises, for example, approximately 20% zinc, approximately 50% zinc, approximately 80% zinc, or approximately 90% zinc in the dry film. The ranges formed by the specific examples are also envisioned, for example, approximately 20% to approximately 50% zinc, approximately 20% to approximately 80% zinc, approximately 20% to approximately 90% zinc, and approximately 50% to approximately 80% zinc. In embodiments of the present disclosure, fluid coating materials 32 with no zinc as well as fluid coating materials 32 comprising at least 95% zinc are additionally envisioned. The zinc may be introduced into the fluid coating material 32 as zinc flakes.

The method may further incorporate additional processing steps like pretreating, cleaning, heating, preheating, rinsing, and any combinations thereof. In an embodiment, the method incorporates a cleaning step, followed by an acid etch, followed by a zinc phosphate rinse, followed by a drying step, then application of the zinc rich coating, curing of the zinc rich coating. In an embodiment, the method further includes application of an electrocoated layer over the zinc rich coating followed by a curing step for the electrocoated layer.

It is noted that when reference is made to ranges throughout this disclosure the ranges defining all subsets therein are also implicitly disclosed. For example, a preferred range of approximately 10 to approximately 30 degrees also includes 10 to 20 degrees, 10 to 20 degrees, 15 to 25 degrees, and all other subsets. Additionally, when reference is made to multiple specific numerical examples the ranges formed by each potential pairing of specific numerical examples are also implicitly disclosed. For example, specific examples of 15 seconds, 30 seconds and 60 seconds also includes the ranges 15 to 30 seconds, 15 to 60 second, and 30 to 60 seconds.

It is noted that terms like "preferably," "commonly," and "typically" and the like are not utilized herein to limit the scope of the claims or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "system" is utilized herein to represent a combination of components and individual components, regardless of whether the components are combined with other components.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A coating system, the coating system comprising a process tank, a coating material supply, an inert gas supply, and a process tank conveyor, wherein:
   the process tank comprises an inlet end and an outlet end;
   the coating material supply is in fluid communication with the process tank, the coating material supply being configured to deliver fluid coating material to a fluid coating level within the process tank;
   the inert gas supply is in fluid communication with the process tank, the inert gas supply being configured to deliver inert gas to form an inert gas blanket extending from the inlet end to the outlet end of the process tank, the inert gas blanket positioned above the fluid coating material such that the process tank is filled with the inert gas from the fluid coating level to an inert gas blanket level, where the inert gas is discharged to the process tank from the inert gas supply below the inert gas blanket level;
   the process tank conveyor defines a tank conveyor path extending at least between the inlet end and the outlet end in the process tank, the process tank conveyor being configured to support a part to be coated; and
   the process tank conveyor comprises a submerge section, a coating residence section, a coating removal section, an inert gas blanket residence section, and an inert gas blanket removal section disposed along a length of the process tank:
   the submerge section adjacent the inlet end, wherein the submerge section comprises a portion of the tank conveyor path configured to transfer the part through and below the inert gas blanket and subsequently below the fluid coating level such that the part is submerged below the fluid coating level during coating;

the coating residence section adjacent and downstream of the submerge section, wherein the coating residence section comprises a portion of the tank conveyor path configured to maintain the part submerged below the fluid coating level for a coating period;

the coating removal section adjacent and downstream of the coating residence section, wherein the coating removal section comprises a portion of the tank conveyor path configured to raise the part above the fluid coating level but below the inert gas blanket level;

the inert gas blanket residence section adjacent and downstream of the coating removal section, wherein the inert gas blanket residence section comprises a portion of the tank conveyor path configured to maintain the part below the inert gas blanket level but above the fluid coating level for a drying period; and the inert gas blanket removal section adjacent and downstream of the inert gas blanket residence section, wherein the inert gas blanket removal section comprises a portion of the tank conveyor path configured to raise the part above the inert gas blanket level towards the outlet end.

2. The coating system of claim 1 wherein the portion of the tank conveyor path of the inert gas blanket removal section is angled at approximately 10 degrees to approximately 30 degrees from horizontal.

3. The coating system of claim 2 wherein the portions of the tank conveyor path corresponding to the inert gas blanket removal section, the submerge section, and the coating removal section are individually angled at approximately 10 degrees to approximately 30 degrees from horizontal.

4. The coating system of claim 1 wherein the portion of the tank conveyor path corresponding to the submerge section is angled at approximately 10 degrees to approximately 45 degrees from horizontal.

5. The coating system of claim 1 wherein the portion of the tank conveyor path corresponding to the coating removal section is angled at approximately 10 degrees to approximately 45 degrees from horizontal.

6. The coating system of claim 1 further comprising a conveyor propulsion source configured to drive the process tank conveyor.

7. The coating system of claim 1 wherein the process tank conveyor further comprises a guide track, a plurality of hanger elements, and hardware characterized by differential movement configured to connect the hanger elements to the guide track.

8. The coating system of claim 6 wherein the process tank conveyor shakes or vibrates upon activation of the conveyor propulsion source.

9. The coating system of claim 1 wherein the process tank comprises a sensor configured to measure a humidity level of the inert gas blanket.

10. The coating system of claim 1 wherein the fluid coating material comprises at least 2 pounds per gallon of volatile organic compounds.

11. The coating system of claim 6, wherein the conveyor propulsion source is further configured to drive the process tank conveyor at a variable speed.

12. The coating system of claim 1, wherein the portion of the tank conveyor path corresponding to the inert gas blanket residence section is configured to move the part substantially horizontally.

* * * * *